United States Patent [19]
Lebail

[11] 3,852,745
[45] Dec. 3, 1974

[54] MULTIPLE SONDE OF THE FOURIER TRANSFORMATION TYPE

[75] Inventor: Patrick Lebail, Neuilly-sur-Seine, France

[73] Assignee: Compagnie Industrielle Des Telecommunications Cit Alcatel, Paris, France

[22] Filed: Apr. 30, 1973

[21] Appl. No.: 355,684

[30] Foreign Application Priority Data
Apr. 28, 1972 France .............................. 72.15414

[52] U.S. Cl. .................. 343/17, 340/5 MP
[51] Int. Cl. .............................. G01s 7/04
[58] Field of Search ............ 343/17; 340/5 MP, 5 H; 73/67.5 H

[56] References Cited
UNITED STATES PATENTS

| | | | |
|---|---|---|---|
| 3,484,740 | 12/1969 | Cook .................................. | 340/5 H |
| 3,631,384 | 12/1971 | Smith, Jr. ............................ | 340/5 H |
| 3,719,922 | 3/1973 | Lopes, Jr. et al. ................ | 340/5 MP |

Primary Examiner—Maynard R. Wibur
Assistant Examiner—G. E. Montone
Attorney, Agent, or Firm—Craig & Antonelli

[57] ABSTRACT

Multiple sonde of the Fourier transformation type. The signals which are representative of the radiation received by detectors, coming from an irradiated object, by means of a coherent radiation, are sampled at two instants separated by a quarter of a period and the samples constitute the true and imaginary parts of the function to which the Fourier transformtion is applied, according to the coordinates of the detectors.

9 Claims, 1 Drawing Figure

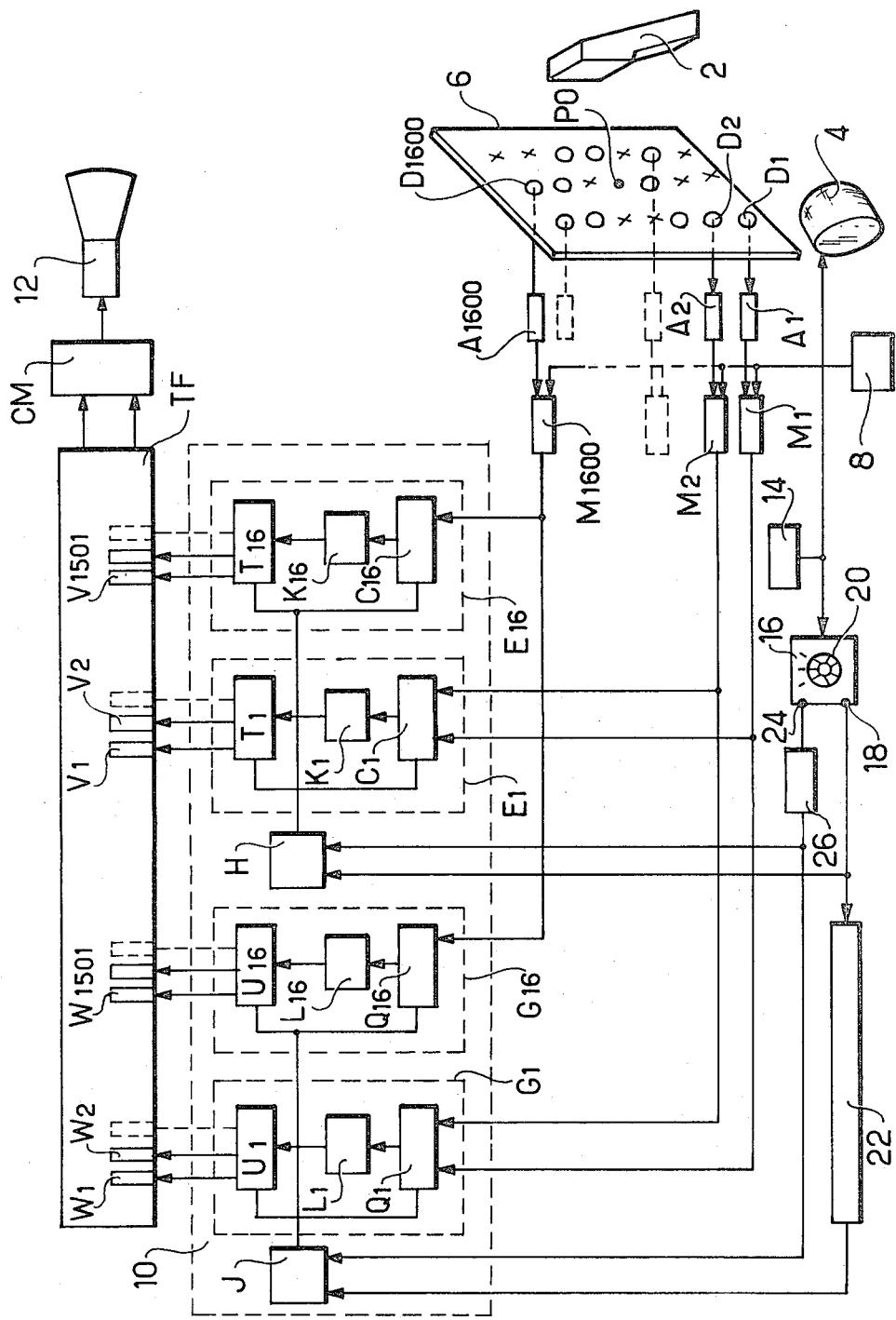

MULTIPLE SONDE OF THE FOURIER TRANSFORMATION TYPE

The present invention concerns multiple sounding, that is, sounding comprising the following operations: irradiation of the object to be sounded by means of a coherent undulating radiation having a suitably selected frequency, receiving the radiation sent back by that object on a matrix of detectors sensitive to the amplitude and the phase of the radiation, and processing of the data established by means of those detectors. That radiation may be of the ultra-sound mechanical wave type and be propagated, for example, in water. But it may also be electromagnetic and the propagation medium may be solid, for example.

These detectors supply, at the output, a periodic receiving signal representative, in amplitude and in phase, of the radiation they receive. It is a known practice to process these receiving signals in a processing assembly which may be of the digital type. More precisely, it is a known practice to sample receiving signals, that is, to record the value which each of these signals assumes at a suitably selected "sampling" instant and to process the sampled values thus obtained by means of a calculator, so as to effect a Fourier transformation in relation to the coordinates of the detectors. These sampled values depend, indeed, on the detector from which they come and they may be considered as samples of a function of the position of that detector.

If, for example, the values sampled all correspond to the same sampling instant and if the detectors are regularly distributed in a rectangular matrix array, the positions of those detectors may be defined by means of rectangular coordinates X and Y and the value sampled is a function of the two variables X and Y, these two variables being able to assume, moreover, only a succession of distinct values.

It is known that a Fourier transformation having two dimensions effected on that function of the variables X and Y may constitute a representation of the object which has sent back the radiation received by the detectors. More precisely, each of the values of the Fourier transformation thus obtained may be ascribed to the direction of the plane waves reaching the detector matrices and considered as representative of the intensity of the waves having that direction. Such a multiple sounding method is therefore well-adapted to the search for directions along which a coherent radiation reaches the matrix of detectors. The output signals of the data processing assembly comprising the Fourier transformation calculator may be applied to a visual display system showing a picture in two dimensions of the object which has sent back the radiation.

It should be observed that the sounding method which has just been described may be applied to sounding in a plane. In that case, the matrix may be reduced to a row of detectors by means of which the direction in which that object is situated is determined in the plane passing through that row and the object which sends back the radiation.

The Fourier transformation of a function Q is defined, in the case of a single true variable whose starting point is X, by the integral of the expression:

$$Q(X) \exp(-jAX)$$

and in the case of two true variables X and Y:

$$Q(X, Y) \exp(-jAX - jBY).$$

The integral is extended to infinity by positive and negative values of X and Y and a complex function of a true variable A or of two true variables A and B is obtained.

It is known that a complex number is the sum of a true part constituted by a first true number and an imaginary part constituted by a second true number which is multiplied symbolically by the imaginary number $j$. The modulus of a complex number is the square root of the sum of the squares of these two true numbers.

It is evidently not feasible to describe here the operation of a Fourier transformation calculator, whether it be in the true branch or in the complex branch, but that operation is well-known to specialists and fast specialized calculators have been produced to effect the mathematical transformations shown above, based on true or complex samples of the starting function Q corresponding to successions of discreet values of the variables X and Y. These calculators provide samples of the transformed function, these true or complex samples corresponding to successions of discreet values of the variables A and B. It must be understood that, when these calculators process complex samples, each of these samples is in the form of a group of two true numbers, the operations effected on these true numbers by the calculator being selected to take into consideration the fact that they represent, the one, the true part, the other, the imaginary part, of the same complex sample.

Known sounds have the disadvantage of providing pictures which produce the phenomenon of duplication; that is, the same object gives rise to two pictures, this making interpretation difficult. One aim of the present invention is to produce a multiple Fourier transformation sound providing improved pictures by the cancelling of the duplication phenomenon.

The present invention has for its object a multiple Fourier transformation sound comprising a source of undulatory radiation irradiating the object to be sounded, a matrix of detectors receiving the said radiation when it is sent back by the object to be sounded, the positions of these detectors being defined on that matrix by their rectilinear coordinates, each of these detectors supplying, at its output, a periodic reception signal representative, in amplitude and in phase, of the radiation it receives, a sampling assembly receiving the receiving signal of each of these detectors and supplying at least one value of that sampled signal at a sampling instant, these sampled values of the receiving signals constituting a "receiving function" which is a function of the coordinates of the corresponding detectors, a Fourier transformation calculator comprising at least one sample memory which records the said sampled values, that calculator effecting a Fourier transformation of the said receiving function thus recorded in such a way that it supplies at the output a transformed function constituting a representation of the object to be sounded, that sound being characterized in that the said sampling assembly comprises means for supplying at least one sampled value of the first type and one sampled value of the second type, of the receiving signal supplied by each of the said detectors, these two values being sampled at two sampling instants separated by an interval of time substantially equal to an odd number of quarters of the period of that receiving signal, the said calculator being suitable for processing the said sampled values of the first and second type in a distinct way, according to the coordinates of the corresponding detectors, to effect a complex Fourier transformation based on a complex receiving function, that complex receiving function being defined, for each group of coordinates corresponding to a detector, by its true part equal to the said sampled value of the first type and by its imaginary part equal to the said sampled value of the second type, the modulus of the function obtained by the said complex Fourier transformation constituting the said representation of the object to be sounded.

It may be demonstrated mathematically that, in the case of plane waves reaching a plane and finished matrix of detectors and of two sampling instants, which are the same for all the detectors, separated by a quarter of a period of the receiving signal, there will be only one peak intensity on the picture obtained, that is, the modulus of the Fourier transformation will have a low value for all the couples having a value of A and B, except in the vicinity of only one of those couples. That maximum is the center of a spot covering a certain surface.

In the case of known sounds using a single sampling instant (the first), the picture obtained will have two points. The one will be the same as previously and the other will be the same as if, at the second sampling instant, the algebraic sign of the detection signals had been reversed. This is the equivalent of saying that any true sample, in the case of a single sampling instant, will act like the juxtaposing of two complex samples combined in the case of two sampling instants separated by a quarter of a period. It is known that two combined complex numbers have true parts which are equal and imaginary parts which are opposite, so that their sum is true.

With reference to the single accompanying diagrammatic FIGURE, an example of the present invention will be described by way of illustration without any limiting character.

The FIGURE shows, partly in a block diagram configuration, an embodiment of the invention.

The FIGURE shows an object 2 immersed, for example, in water, as well as a source of radiation 4, constituted, for example, by an ultrasound projector whose frequency is $Fr = 500$ Kc/s and a matrix 6 of detectors which is also immersed in water.

That matrix may, for example, comprise 128 lines and 126 columns at each intersection of which a piezo-electric detector suitable for supplying an electric signal which is representative of the radiation it receives, may be arranged, the frequency being maintained. Indeed, to avoid the use of too great a number of detectors, it is a known practice to arrange these latter only at certain intersections of the lines and columns, one in ten or one in a hundred, for example, these intersections having a distribution called a "pseudo random" distribution suitably selected to minimize the interference effects of the lack of detectors at the other intersections. It is known that that lack is then substantially equivalent to a noise which would affect the detection signals.

In the example described, 1600 detectors such as D1, D2, D1600 are used. With a view to simplifying the FIGURE, those detectors are shown as being placed at the intersections of three lines and seven columns. Certain intersections of these lines and these columns are shown without any detector, more particularly that which is placed in the center of the matrix and which bears the reference PO.

The source 4 and the matrix 6 are arranged so that the radiation emitted by the source 4 be sent back partly by the object 2 in the direction of the matrix 6. The detection signal supplied by each of the detectors D1, D2 and D1600 is applied to an amplifier, such as amplifiers A1, A2 and A1600, then to a mixing circuit, such as circuits M1, M2 and M1600, in which it is mixed with an auxiliary sinusoidal signal whose frequency is, for example, $Fr = 480$ Kc/s supplied by an auxiliary oscillator 8. The mixing circuits, such as circuits M1, M2 and M1600, supply at the output a differential beat signal whose frequency is $Fb = Fr - Fa$ which equals, in this example, 20 Kc/s; this signal will be called, hereinafter, the "receiving signal," for it is representative, in phase and in amplitude, of the radiation received by the detectors, such as detectors D1, D2 and D1600.

Those receiving signals are applied to a sampling assembly 10 comprising several sampling systems of a first type, such as systems E1 and E16, all constituted in the same way and, according to the present invention, by sampling systems of a second type, such as systems G1 and G16, constituted in the same way as those of the first type. These sampling systems are, in the example described, sixteen in number for the first type and sixteen for the second type.

The receiving signal supplied by each of the mixing circuits, such as circuits M1, M2 and M1600, is applied to a sampling system of the first type and to a sampling system of the second type. The sampling instants could be the same for all the signals sampled in a system of the first type, for example. It is, however, preferable to determine them in the following way.

In the case, most frequent in practice, where the distance of the object examined is not very great in relation to the dimensions of the matrix 6, the detectors are sampled one after another, starting from the center PO of the matrix, so that the sampling of a detector is delayed by a time proportional to the square of its distance from the center PO and inversely proportional to the distance of the object. That sampling delay without relation to the present invention, enables the spherical nature of the waves reaching the matrix 6 to be taken into consideration.

Taking into account the limited speed of the operation of the sampling circuits and of the great number of detectors, it is advisable to effect simultaneously several successions of sampling operations. Each of these successions affects an angular sector of the matrix 6. The number of these sectors is equal to sixteen in the example described. Each of these sectors comprises a hundred detectors, such as detectors D1, D2 and D1600. The limit between two sectors is substantially rectilinear and has, for its origin, the starting point PO. The receiving signals coming from the detectors of the same sector are all applied through mixing circuits to the same sampling system of the first type and to the same sampling system of the second type, so that any sector of the matrix is connected to a sampling system of the first type and to a sampling system of the second type.

Each of these sampling systems, for example, the circuit E1, comprises a switching circuit, for example circuit C1. The switching circuit comprises input terminals which constitute, simultaneously, the input terminals of the sampling assembly 10 and the input terminals of the sampling system E1. These terminals are connected as described above to the outputs of a group of the said mixing circuits, that group corresponding to one of the previously mentioned sectors. For example, the switch C1 comprises a hundred input terminals connected to the outputs of the mixing circuits M1, M2, M1600, only the mixing circuits M1 and M2 being shown.

The switching circuit C1 comprises an output terminal connected to the input of a sampling circuit K1 so as to connect successively the output of each of the mixing circuits of that group to the input of that sampling circuit, beginning with the mixing circuits connected to the nearest detectors to the point PO. That sampling circuit K1 is constituted in the assembly described by a coding circuit, that is, it supplies, at the output, digital numbers representing the value of the signal which is applied to its input. These output signals may be distributed on several output terminals or be supplied sequentially on a single output terminal. To simplify the drawing, a single output terminal has been shown, it being understood that that single terminal may represent several output terminals of a true coding circuit.

An addressing circuit T1 comprises an input terminal connected to the output of the coding circuit K1 and of the output terminals which also constitute output terminals of the sampling assembly 10 and the output terminals of the sampling system E1. The addressing circuit T1 comprises a number of output terminals equal to that of the input terminals of the switching circuit C1. The function of the addressing circuit T1 is to connect successively the output of the coding circuit K1 to each of the output terminals of that addressing circuit, in a predetermined order of succession.

The other sampling systems are consituted in the same way. The switching circuits are designated by the letter C for sampling systems of the first type and by the letter Q for sampling systems of the second type. The coding circuits are designated by the letters K for sampling systems of the first type and by the letter L for sampling systems of the second type. The addressing circuits are designated by the letter T for sampling systems of the first type and by the letter U for sampling systems of the second type. These letters are followed by a number which is the same as that which follows the letter E or the letter G in the reference of the sampling systems to which these circuits belong.

All the switching circuits, such as circuits C1 and C16, and all the addressing circuits, such as circuits T1 and T16, of the sampling systems of the first type are synchronized by a clock H. referred H, herein as a "sampling clock." Likewise, the switching circuits, such as circuits Q1 and Q16, and the addressing circuits, such as circuits U1 and U16, of the sampling systems of the second type are synchronized by the same sampling clock J. That synchronization is effected so that, within the sampling system E1, for example, each time the switching circuit C1 passes from one of its input terminals to the following, the addressing circuit T1 passes simultaneously from one of its input terminals to the following. As the succession orders are predetermined, in both cases, the result is that an output terminal of the addressing circuit T1 may be made to correspond to each input terminal of the switching circuit C1, so that two corresponding terminals always will be connected together through the coding circuit K1.

The sampling clocks H and J are similarly constituted. Their frequencies are identical and may be controlled and they begin to send out the clock pulses only when they receive a start up pulse. The switching and addressing circuits, such as circuits C1, T1, Q1 and U1, are synchronized by these clock pulses.

The output terminals of the sampling assembly 10, that is, the output terminals of the addressing circuits, such as circuits T1, T16, U1 and U16, are connected to sample memories of a first type, such as memories V1, V2 and V1501, and of a second type, such as memories W1, W2 and W1501, which form a part of a fast Fourier transformation calculator TF.

These addressing circuits and these sample memories are constituted so that the sample memories record the output signals of the coding circuits, such as circuit K1. If n designates a whole number which may vary from 1 to 1600, the detector Dn is connected through the mixing circuit Mn, a switching circuit, such as circuit C1, a coding circuit, such as circuit K1 and an addresssing circuit, such as circuit T1, at an instant determined by the synchronous operation of these switching and addressing circuits, to the sample memory Vn. At an instant determined similarly, that detector Dn is connected to the sample memory Wn through a switching circuit, such as circuit Q1, a coding circuit, such as circuit L1, and an addressing circuit, such as circuit U1.

The calculator TF may be of a known type. A universal calculator with a two-dimensional Fourier transformation calculating program has been used. That operation has also been effected with a specialized commercial calculator supplying the Fourier transformation in 1 dimension. With such a calculator, the calculating of the Fourier transformation is effected line by line in the matrix. The results thus obtained, which form a new intermediate matrix, are memorized. The calculating of the Fourier transformation is effected once again on that intermediate matrix, proceeding, this time, column by column. It is then possible to supply to a modulus calculator CM, the values of a complex Fourier transformation, which supplies the values of the modulus of that transformation to a visual display system 12. That transformation is effected on the basis of a "receiving function" which itself is also complex, of which all samples of the order $n$ are constituted, inasmuch as concerns its true part, by the number recorded in the sample memory of the first type V$n$ and, inasmuch as concerns its imaginary part, by the number recorded in the sample memory of the second type W$n$. That receiving function is a fucntion of the rectangular coordinates of the detectors on the matrix 6.

That sample of the order n is processed in that calculator as was the value of the sample of that function corresponding to the coordinates of the detector D$n$.

The starting up of the sampling clocks H and J is effected as follows: a starting up circuit 14, which may be switched manually or automatically in a repetitive way supplies a sounding start up pulse which is applied, on the one hand, to the radiation source 4 so as to make it supply, in the form of radiation, a transmission pulse and, on the other hand, in a known way, to a deviation control circuit 16 which is suitable for supplying, on one of its output terminals 18 a first switching start up pulse which is delayed in relation to the sounding start up pulse. The time difference between these two pulses may be adjusted automatically or manually by means, for example, of an adjusting knob 20. It is known that that time difference is representative of the distance between the sound and the objects such as 2 of which, it is supposed, a representation will be obtained. That first switching start up pulse appearing at the terminal 18 is applied to the clock H and starts up the transmission of clock pulses and hence, the switching process by the switching circuits such as C1 and the addressing circuits such as T1. The first switching start up pulse is, moreover, applied, according to the present invention, to a delay circuit 22 at whose output a second switching start up pulse appears, the time between the first and second switching start up pulses being selected, according to the invention, equal to a quarter of the period of the receiving signal supplied by the mixing circuits such as M1, M2, M1600. That time could, however, be selected equal to an odd number of quarters of that period. That second switching start up pulse is applied to the clock J and starts up the transmission of clock pulses which cause the switching process to take place in the switching circuits such as Q1, Q16 and the addressing circuits such as U1 and U16.

The frequency of the clocks H and J, which is the same, is controlled as follows: the difference control circuit 16 sends out to an output terminal 24, a time difference signal representative of the time difference brought about by that circuit 16 between the sounding start up pulse and the first switching start up pulse. That time difference signal is applied to a frequency control circuit 26 which controls simultaneously the frequency of the clocks H and J so as to make that frequency substantially equal to the product of that time difference and a predetermined coefficient. It should be observed that the duration of the switching process selected is small in relation to the time difference brought about by the circuit 16.

The operation of the sound which has just been described may be explained as follows: the signals representative of the amplitude and of the radiation phase received by the detectors are recorded in the sample memories of the Fourier transformation calculator TF. The receiving signal coming from the mixing circuit Ma is sampled at two different instants:

1. It is sampled by means of a coder such as K1 and K16, a certain time, depending on the number n after the first switching start up pulse and the corresponding sampled value is recorded in the sample memory Vn. That time will be called "sample delay;"

2. It is sampled, by means of a coding circuit such as L1, L16, a certain time, depending on the number n after the second switching start up pulse.

That second sampling delay is equal to the first, that is, the duration between that second sampling and the first sampling is the same as that between the first and second switching start up pulse. This results from the fact that the switching processes selected are identical within sampling systems of the same order, the one of the first type and the other of the second type. That second sampled value, which is recorded in the sample memory Wn, therefore corresponds to a sampling instant delayed, according to the invention, by a quarter of the period of the receiving signal in relation to that which corresponds to the first sampled value recorded in the sample memory Vn.

It has been explained previously that the modulus of the complex Fourier transformation constitutes a good representation of an object such as 2, if the samples of the complex function which is to be transformed are constituted, inasmuch as concerns their true part, by the number recorded in the sample memories such as Vn and, inasmuch as concerns their imaginary part, by the numbers recorded in the sample memories such as Wn.

It must be understood that the sample memories such as V1 and V2 corresponding each to one of the outputs of the addressing circuit such as T1, hence to one of the inputs of the switching circuit such as C1, hence to one of the detectors such as D1, are connected with the Fourier transformation calculator TF, so that that calculator takes into consideration the coordinates of that detector on the matrix.

When the receiving signal is a differential beat signal having a frequency lower than that of the radiation detected by the matrix 6, the sampling delays are multiplied by the relation between the frequency Fr of the radiation used and the frequency Fb of the receiving signal.

It must be understood that the frequency of the sampling clocks H and J must depend on the time difference E, according to the expressions of the sampling delay which have been described above. That is why the time difference control circuit 16 controls, by means of the frequency control circuit, sampling clocks H and J, so as to make it proportional to that time difference.

What I claim is:

1. Multiple Fourier transformation sonde comprising a source of undulatory radiation irradiating the object to be sounded, a matrix of detectors receiving said radiation sent back by said object, the positions of said detectors being defined on said matrix by their rectilinear coordinates, each of said detectors supplying at its output a periodic reception signal representative in amplitude and in phase of the radiation it receives, sampling assembly means for receiving the reception signal of each of said detectors and for supplying at least one value of that sampled signal at a sampling instant, said sampled values of the reception signals being a function of the coordinates of the corresponding detectors, Fourier transformation calculator means for effecting a Fourier transformation of the said receiving function thus recorded in such a way that it supplies at the output a transformed function constituting a representation of the object to be sounded, said transformation calculator means including at least one sample memory means for recording said sampled values, said sampling assembly comprising means for supplying at least one sampled value of a first type and one sampled value of a second type, of the reception signal supplied by each of the said detectors, means for sampling said values of said first and second types at two sampling instants separated by an interval of time substantially equal to an odd number of quarters of the period of said reception signal, said calculator means further including means for processing said sampled values of said first and second type according to the coordinates of the corresponding detectors to effect a complex Fourier transformation based on a complex receiving function which is defined for each group of coordinates corresponding to a detector by its true part equal to the said sampled value of the first type and by its imaginary part equal to the said sampled value of the second type, the modulus of the function obtained by the said complex Fourier transformation constituting said representation of the object to be sounded.

2. Sonde according to claim 1, wherein said time interval between the said two sampling instants is of the same duration and in the same direction for all the said detectors.

3. Sonde according to claim 2, wherein each of the said detectors receiving the said radiation sent back by the object to be sounded is provided with frequency transposing means receiving the output signal of that transducer and using an auxiliary signal having the same frequency for all the detectors, the said receiving signal being constituted by the signal transposed at the output of these transposing means.

4. Sonde according to claim 1, wherein said sampling assembly means includes a plurality of sampling circuits each including coding means for providing a digital output representative of the value of a signal input, switching means for sequentially connecting selected detector outputs to said coding means and an addressing circuit connecting said coding means to said transformation calculator means.

5. Sonde according to claim 4, wherein said sampling circuits are provided in first and second groups providing said sampled values of said first and second types, and control means for enabling said first and second groups of sampling circuits during different time intervals.

6. Sonde according to claim 5, wherein said control means includes first and second clock signal generators, start means for generating a start pulse applied to said source of radiation to initiate operation thereof, and timing means responsive to said start pulse for sequentially operating said first and second clock signal generators.

7. Sonde according to claim 6, further including a mixer connected between the output of each detector and a corresponding sampling circuit and an oscillator connected to said mixers to produce a beat frequency at the output thereof.

8. Sonde according to claim 7, wherein said timing means includes first delay means for providing said start pulses to said first clock signal generator with a selectable delay and second delay means for applying the output of said first delay means to said second clock signal generator with a delay equal to an odd number of quarters of the period of said reception signal.

9. Sonde according to claim 8, wherein said timing means further includes frequency control means responsive to the delay of said first delay means for controlling the frequency of said first and second clock signal generators.

* * * * *